(12) United States Patent
Morimoto et al.

(10) Patent No.: US 6,418,235 B1
(45) Date of Patent: Jul. 9, 2002

(54) ORGANISM COLLATING METHOD AND APPARATUS

(75) Inventors: Masaru Morimoto; Ichiro Kubo; Hiroshi Yano; Sumiaki Adachi, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/391,241

(22) Filed: Sep. 7, 1999

(30) Foreign Application Priority Data

Sep. 11, 1998 (JP) .......................................... 10-258208

(51) Int. Cl.7 ................................................ G06K 9/00
(52) U.S. Cl. ..................................... 382/118; 340/5.83
(58) Field of Search ................................. 382/115, 118, 382/190; 351/204; 704/246, 273; 348/161; 235/380, 382; 902/3, 4, 25; 340/5.53, 5.8, 5.81, 5.83; 705/1, 26, 42; 702/127

(56) References Cited

U.S. PATENT DOCUMENTS 5,400,722 A * 3/1995 Moses et al. ................ 109/2
5,555,512 A * 9/1996 Imai et al. ................ 702/127
5,835,616 A * 11/1998 Lobo et al. ................ 382/118
5,973,731 A * 10/1999 Schwab ...................... 348/161

FOREIGN PATENT DOCUMENTS

CA          2142227          *  8/1996

* cited by examiner

Primary Examiner—Samir Ahmed
(74) Attorney, Agent, or Firm—Dickstein Shapiro Morin & Oshinsky LLP

(57) ABSTRACT

An organism collating device for collating concordance of an organism in dimension with characteristics of the registered organisms includes a storage means for storing attribute data classifying kinds of organisms relating to the characteristics of the organisms, an extraction means for extracting organism characteristics and attribute data from the organism, and a collation means for searching the organism characteristics stored in the storage means based the attribute data executed by the extraction means to collate the searched organism characteristics with the extracted organism characteristics for specifying an organism.

16 Claims, 4 Drawing Sheets

F I G. 2
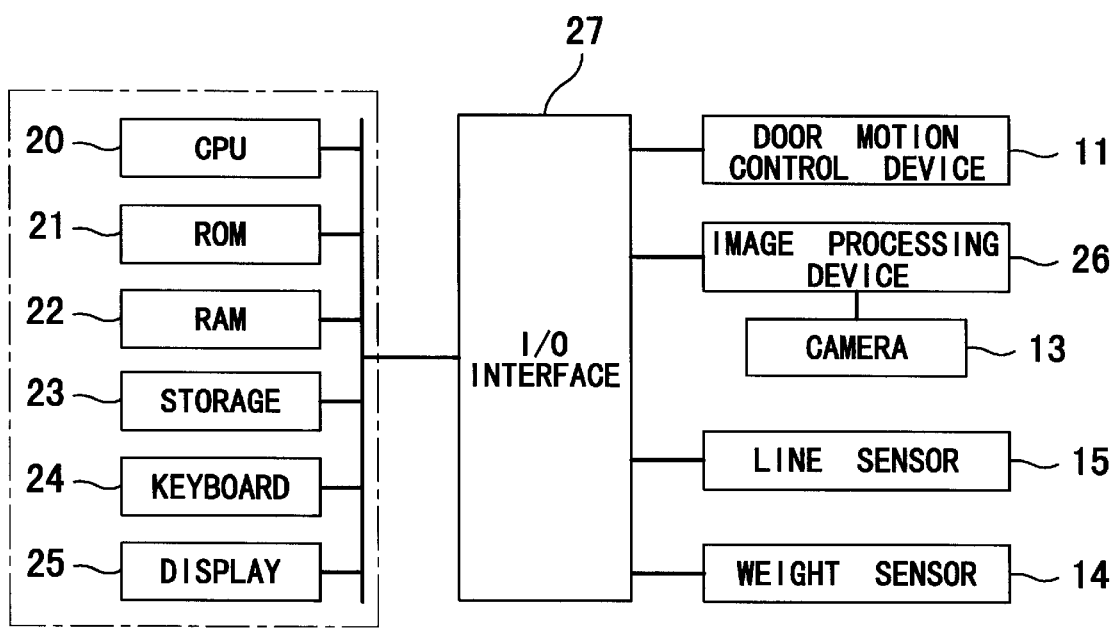

FIG. 3

| GIVEN NAME | A |
|---|---|
| CODE | ID × × × × |
| REGISTRATION ITEM | REGISTRATION Y-M-D, NUMBER |
| FACE DATA | CONTOUR LINE, AREA, INTERVAL OF EYES, POSITION OF NOSE, CENTROID OF FACE, OTHERS |
| ATTRIBUTE DATA | ADDRESS |
| | COMPANY NAME, POSITION DEPARTMENT NAME |
| | BODY HEIGHT, BODY WEIGHT, BODY TYPE (LARGE, ORDINARY, SMALL) |
| | SEXUALITY |
| | AGE (AGE GROUP, OLD, LATE MIDDLE, YOUNG, CHILD) |
| | COLLATION FREQUENCY RATE (TIMES/PERIOD OR DAY) |
| | COLLATION HISTORY — LAST ENTRY/EXIT Y-M-D, TIME / THE LAST BUT ONE ENTRY/EXIT Y-M-D, TIME |
| | SPECIFIC PERSON (LOITERING PERSON, OTHER) |
| | EXCLUSIVE USE TOOL (WHEEL CHAIR, WALK ASSISTANT INSTRUMENT, SHAPE AND COLOR OF CLOTHES, etc.) |
| | SPECIAL CONSIDERATION |

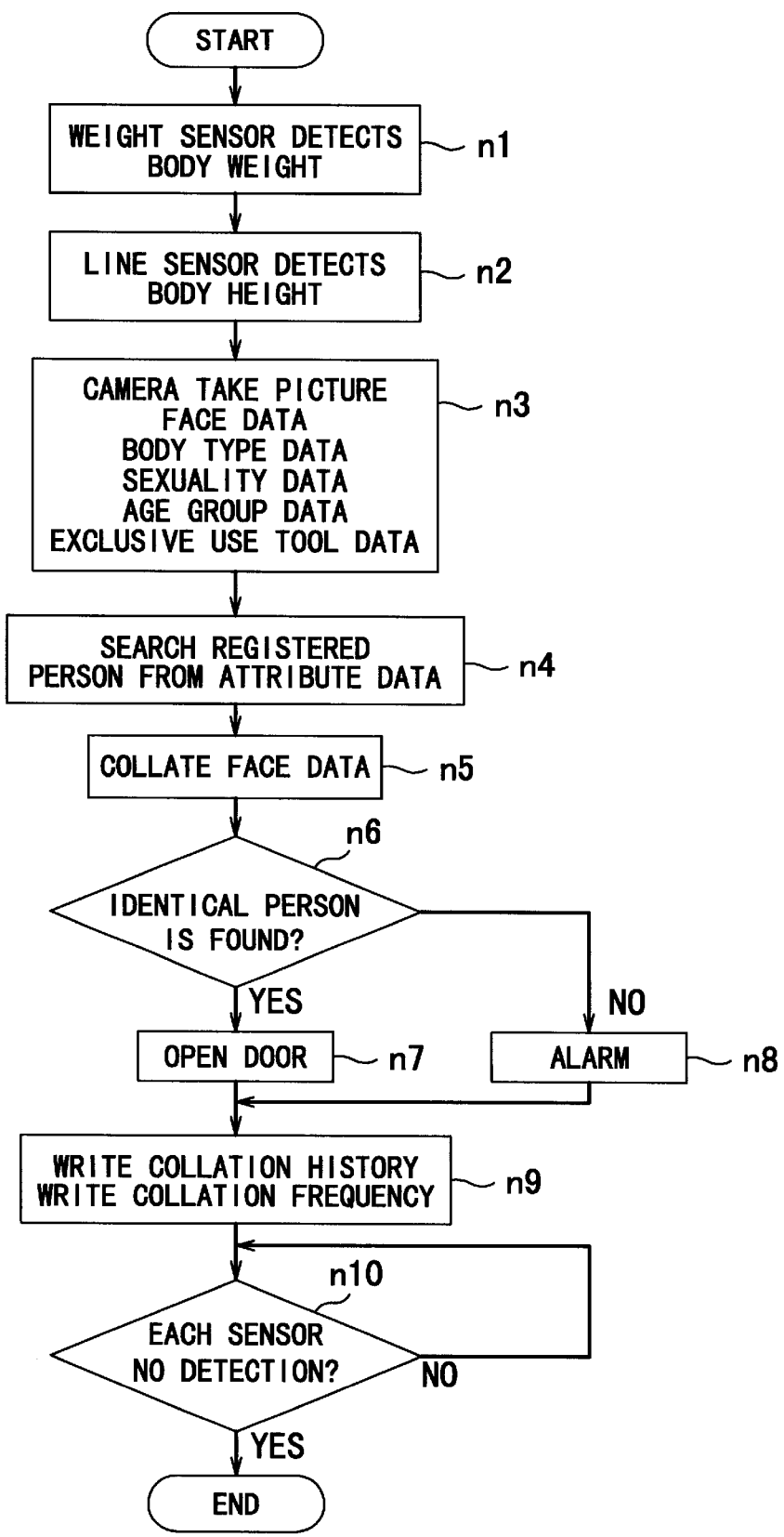

ORGANISM COLLATING METHOD AND APPARATUS

BACKGROUND OF THE INVENTION

1. Field of the Invention

This invention relates to an organism collating method and apparatus for specifying an identical person by detecting organism characteristics of a human being, and more particularly an improved collating method and apparatus for specifying an identical person by collating a face as organic characteristics of the human being.

2. Description of the Related Art

There is well known a collating method for collating a face in which an image of a face is taken by a camera beforehand to register its face data such as contour line and area of the face, interval of its eyes and so forth and a face image taken by the camera is collated with the registered face image to specify the identical person.

Such a conventional collating method, however, takes a long time period, different from well known verification of passwords, because extremely much quantity of face data have to be registered beforehand each of which is separately searched and collated.

As the number of persons to be registered increases, the search collation takes longer time, thereby giving the user discomfort by unfavorably waiting the completion of the search collation.

In order to solve the problem, there may be proposed reduction of face data, for example, reduction of the data items of a contour, an area, a centroid, an interval of eyes, a nose position and so forth, or reduction of data capacity in each item, thereby deteriorating the accuracy of collation and the reliability.

SUMMARY OF THE INVENTION

It is, therefore, a primary object of this invention to provide an organism collating method and apparatus which can shorten retrieval time with maintaining the accuracy of collation even if there is much number of the living bodies to be registered as to the organism characteristics.

According to a first aspect of this invention, there is provided an organism collating device for collating concordance of an organism in dimension with characteristics of the registered organisms, which includes a storage means for storing attribute data classifying kinds of organisms relating to the characteristics of the organisms, an extraction means for extracting organism characteristics and attribute data from the organism, and a collation means for searching the organism characteristics stored in the storage means based on the attribute data extracted by the extraction means to collate the searched organism characteristics with the extracted organism characteristics for specifying an organism. The collating device extracts the organism characteristics and its attribute data from an organism (a human being or an animal), searches the registered data of organism characteristics in dimension with the attribute data, and specifies the organism by collating the search organism characteristics with the extracted organism characteristics, whereby a large quantity of the organism characteristic data is focused by the above-mentioned attribute data (hereinafter called as "focused") and the time for search may be shortened. Moreover, the data of the organism characteristics is not reduced, thereby maintaining the accuracy of the collation.

According to a second aspect of the invention, there is provided an organism collating device of the first aspect of the invention in which the attribute data is set by a body height, a body weight, a shape and color of clothes. When the attribute data is set to the body height of organism, the body weight, the shape and color of clothes, for example, the collation may be focused to specific body configuration or working clothes of a specific plant.

According to a third aspect of this invention, there is provided an organism collating device of the first aspect of the invention in which the attribute data is set to a magnitude of the collation frequency. When the attribute data is set to the magnitude of the collation frequency, the collation may be focused to the organisms doing frequent entrance and exit of specific area.

According to a fourth aspect of this invention, there is provided an organism collating device of the first aspect of the invention in which the attribute data is set to an age or an age group of an old, a late middle, a young, or a child. When the attribute data is set to the age group or the age, effective focus may be made when the age group has large difference in the ages.

According to a fifth aspect of this invention, there is provided an organism collating device of the first aspect of the invention in which the attribute data is set to a person exiting from a specific area. When the attribute data is set to the persons exiting from the specific area, effective focus may be made by setting to the exiting persons because the entering persons are predicted to exit where many specific persons enter into and exit from the specific area such as a laboratory.

According to a sixth aspect of this invention, there is provided an organism collating device of the first aspect of the invention in which the organism characteristics is set to face data of organisms.

According to a seventh aspect of this invention, there is provided an organism collating method in the device of the first aspect of the invention in which attribute data is searched beforehand and organism characteristics corresponding to the searched attribute data is collated.

BRIEF DESCRIPTION OF THE DRAWINGS

Other objectives and advantages of this invention will be more readily apparent from the following detailed description provided in conjunction with the following figures, of which:

FIG. 2 is a schematic block diagram of the collating device of FIG. 1;

FIG. 3 is a table of personal data of a registered person registered in a storage of FIG. 2; and FIG. 4 is a flow chart of an open-and-close operation of the door system of FIG. 1.

DETAILED DESCRIPTION OF THE PREFERRED EMBODIMENT

Figure 1:
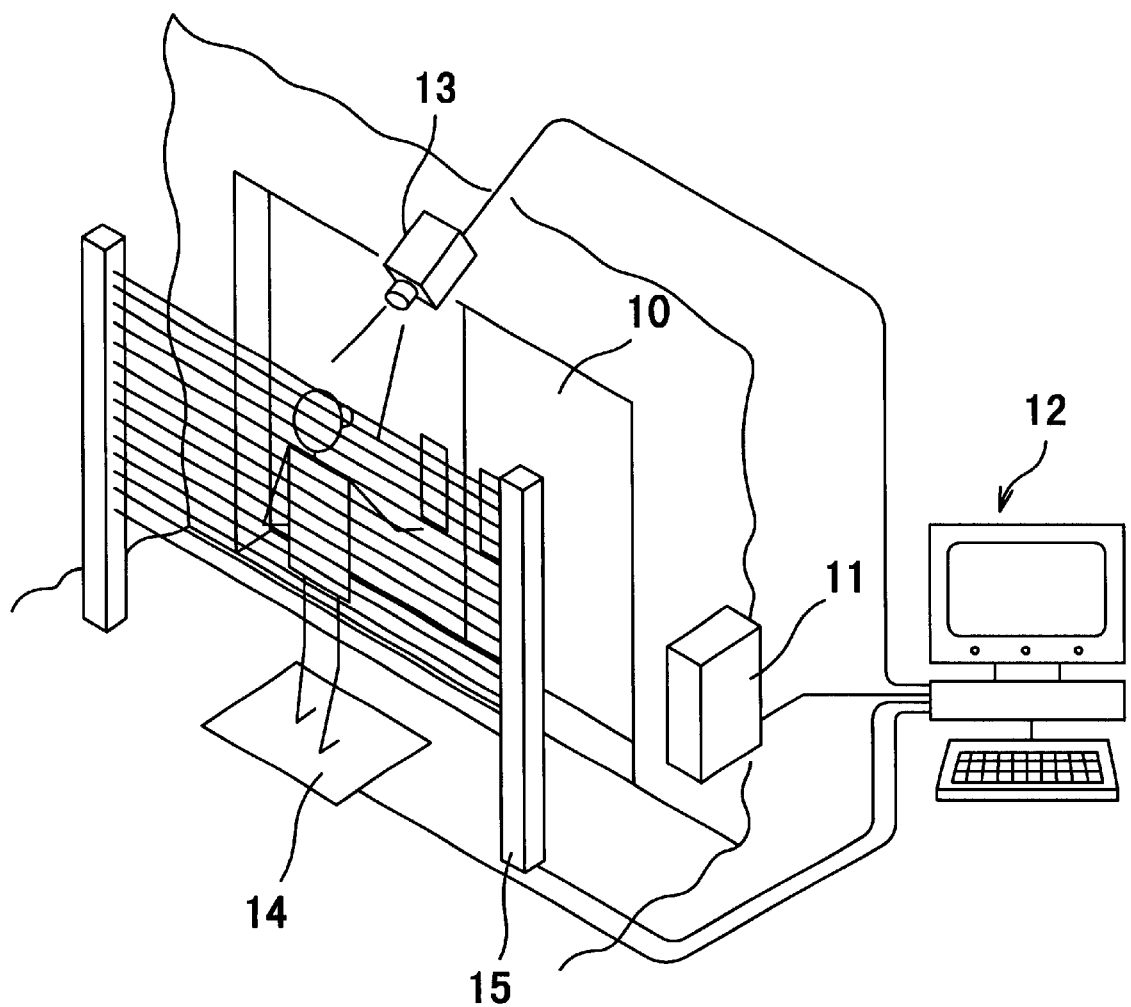
FIG. 1 is a perspective view of a door open-and-close system employing a collating device according to a preferred embodiment of this invention.

Referring, now, to FIG. 1, there is shown a door open-and-close system employing a collating device 12 according to a preferred embodiment of this invention, in which the organism is a human being. A door 10 is the electric door which opens and closes right and left in a sliding door formula, and is driven to opening and closing by a door open-and-close motion control device 11 which is driven by a control signal produced from the collating device 12. The door 10 is disposed exclusively for entrance or exit. If the door is disposed in common use for entrance and exit, the equipments described below should be disposed on the other side of the door 10.

A video camera 13 is disposed above the door 10 to take a picture of a person (an arrival person) who is going to pass the door 10, and extracts from the taken picture various data as to a face, a body type (large, ordinary, and small), a shape, color and design of the clothes, an age group, a sexuality, and a tool exclusively used by the person such as a wheel chair, walk assistant instrument or the like.

A weight sensor 14 of a mat type is disposed in front of the door 10 to weigh a weight of the person, and a line sensor 15 having a group of photoelectric sensors of a light projecting type is installed into a pair of poles to measure the body height of the person.

The collating device 12 is connected with the camera 13, the weight sensor 14 and the line sensor 15 to receive the image picture signal, a weighed signal and a measured signal.

In FIG. 2, there is shown a schematic block diagram of the collating device 12 of FIG. 1, in which a central processing unit (CPU) 20 activates and controls each circuit device according to a program stored in a read-only-memory (ROM) 21 and a random-access-memory (RAM) 22 stores data necessary for the operation.

Face images of the registered persons are taken by a camera beforehand to extract face data such as a contour line and area of the a face, an interval of eyes, a position of a nose, centroid of the face, and a storage 23 stores personal data including the extracted face data together with attribute data of the same registered person for the number of the persons to be registered. A keyboard 24 is disposed to enter the items and data necessary for the operation, and a display 25 indicates display facts.

The CPU 20 is connected with the door motion control device 11, an image processing device 26 connected with the camera 13, the weight sensor 14, and the line sensor 15 through an I/O interface 27. The image processing device 26 processes the picture image taken by the camera 13 to make image data which can be collated for application to the CPU 20.

FIG. 3 shows a table of personal data of a person to be registered in the storage 23 for collation. The personal data includes a given name of the registered person, a registration item (a registration date and a registration number), face data of the registered person, and attribute data for classifying the registered person. The given name of the registered person, for example, is "Mr. A", and the registration item is a registration data and a registration number. The face data includes a contour line and an area of a face, an interval of eyes, a position of a nose, a centroid of the face, and other personal data such as characteristics wounds and moles based on the image taken as to the face as organism characteristics.

The attribute data belongs to the registered person and/or face data, and consists of data classifying the kinds. That is, it includes an address, a working company name, its position department, a body height, a body weight, a body type (large, ordinary, or small), sexuality, age and/or an age group (an old, a late middle, a young or a child), a collation frequency rate how many times the collation was done per period or day, year-month-day and its time when the person entered or exited through the door 10 on collation, a collation history, a specific person (for example, a loitering person frequently entering or exiting through the door 10 without any intention in a nursing home, or other person), a wheel chair, a walk assistant instrument, other tool exclusively used by the person, and the specific items to be registered.

In FIG. 4, there is shown a processing operation of the CPU 20 controlling opening of the door 10 by thus constructed collating device 12. As a person comes to the door 10, the weight sensor 15 detects the arrival of the person to produce a detection signal and data of the measured weight, and the line sensor 14 also detects the arrival of the person to produce a detection signal and data of the measured body height. These signals and data are applied to the CPU 20, the camera 13 is activated to take a picture of the arrival person, the taken picture is processed by the image processing unit 26 to produce image data capable of being collated for application to the CPU 20 which extracts the face data and the attribute data including body type data, sexuality data, age group data, and exclusive use application tool data based on the image data (steps n1, n2, and n3).

Registered persons stored in the storage 23 are focused and searched on the basis of the attribute data of body type data, sexuality data, age group data and exclusive use application tool data, and the above-mentioned attribute data of the body weight and body weight, thereby collating the searched face data of the registered person and the face data extracted from the image taken by the camera 13 (steps n4 and n5).

If there can be found an identical person who has the coincidence with the face data of the arrival person in the registered persons or who is judged to be the same person at the predetermined collation ratio as a result of the collation, the door open-and-close motion control device 11 is driven to control the opening of the door 10 for allowing the arrival person to pass the door. Unless there can be found any identical person, the door 10 remains to be closed and the display 25 indicates an alarm (steps n7 and n8).

If the arrival person coincides with a registered person, the collation history of the attribute data of the registered person, namely, the year, month and day and time of the entry is stored. Then the collation frequency ratio is revised (step n9).

When the arrival person enters into the door 10 or leaves by its entry rejection, the movement of the person is sensed by the weight sensor 14 and the line sensor 15 to complete the operation.

When the collation frequency ratio and the collation history are desired to be used as attribute data, it may be performed by entering them through keyboard 24 of the collating device 12.

If the arrival person uses his identification card, its reader it disposed on the pole of the line sensor 15 to read the card. By recording the data of his address, a working company name, and a position department name, the recorded data may be extracted as attribute data.

Thus, according to this embodiment, the face data and its attribute data are extracted from the arrival person of the door 10, a registered person is searched based on the attribute data, the face data of the searched registered person is collated with the face data taken by the camera 13 to identify the arrival person, a large number of registered person or face data may be focused or decreased as objects to be collated, thereby shortening the search time. Since the items of the face data are not decreased, the collation accuracy may be retained.

When the attribute data is set to the body height of organism, the body weight, the shapes and colors of clothes, for example, the collation may be focused to specific body configuration or working clothes of a specific plant.

When the attribute data is set to the magnitude of the collation frequency, the collation may be focused to the organism doing frequent entrance and exit of a specific area.

When the attribute data is set to the age group of the age, effective focus may be made when the age group has large difference in the ages.

When the attribute data is set to the persons exiting from the specific area, effective focus may be made by setting to the exiting persons because the entering persons are predicted to exit where may specific persons enter into and exit from the specific area such as a laboratory.

The organism characteristics of this invention may correspond to the face data of this embodiment and other organism characteristics such ad dactylogram, sonagram, and retina. The organism of this invention may be a human being or animals, the storage means corresponds to the storage 23, the extraction means corresponds to the extracting function of face data and attribute data in the CPU 20, and the collating means corresponds to the collating function of the CPU 20, but this invention is not limited to the foregoing embodiment.

What is claimed is:

1. An organism identification device comprising:

a storage device which stores respective face data of a plurality of individual organisms in predefined organism classes, the location of an individual organism's face data within a particular class being defined by non-facial attribute data of the individual organism;

a camera for taking a picture of an arriving organism and producing arrival organism face data;

a device for determining non-facial attribute data of said arriving organism; and a collation device for determining which one of said predefined organism classes the arriving organism's face data belongs to by evaluating the non-facial attribute data of said arriving organism and for comparing the face data of said arriving organism with stored face data within said determined class to identify the arriving organism.

2. An organism identifying method comprising:

storing respective face data of a plurality of individual organisms in predefined organism classes, the location of an individual organism's respective face data within a particular class being defined by non-facial attribute data of the individual organism;

taking a picture of a face of an arriving organism;

producing arrival organism face data;

determining non-facial attribute data of said arriving organism;

determining which one of said predefined organism classes the arriving organism's face data belongs to by evaluating the non-facial attribute data of said arriving organism; and comparing the face data of said arriving organism with stored face data within said determined class to identify the arriving organism.

3. An organism identification device comprising:

a storage device which stores respective face data of a plurality of individual organisms in predefined organism classes, the location of an individual organism's face data within a particular class being defined by non-facial attribute data of the individual organism;

a camera for taking a picture of a face and a body of an arriving organism and producing arrival organism face data and non-facial attribute data; and a collation device for determining which one of said predefined organism classes the arriving organism's face data belongs to by evaluating the non-facial attribute data of said arriving organism and for comparing the face data of said arriving organism with stored face data within said determined class to identify the arriving organism.

4. An organism identification method comprising:

storing respective face data of a plurality of individual organisms in predefined organism classes, the location of an individual organism's face data within a particular class being defined by non-facial attribute data of the individual organism;

taking a picture of a face and a body of an arriving organism and producing arrival organism face data and non-facial attribute data;

determining which one of said predefined organism classes the arriving organism's face data belongs to by evaluating said non-facial attribute data of said arriving organism; and comparing the face data of said arriving organism with stored face data within said determined class to identify the arriving organism.

5. An organism identification device according to claim 1 in which said attribute data includes a body weight of said arriving organism.

6. An organism identification device according to claim 1 in which said attribute data includes a shape of clothes worn by said arriving organism.

7. An organism identification device according to claim 1 in which said attribute data includes a color of clothes worn by said arriving organism.

8. An organism identification device according to claim 1 in which said attribute data includes an age of said arriving organism, wherein said age is an old age.

9. An organism identification device according to claim 1 in which said attribute data includes an age of said arriving organism, wherein said age is a late middle age.

10. An organism identification device according to claim 1 in which said attribute data includes an age of said arriving organism, wherein said age is a young age.

11. An organism identification device according to claim 1 in which said attribute data includes an age of said arriving organism, wherein said age is a child age.

12. An organism identification device according to claim 1 in which said evaluating the non-facial attribute data of said arriving organism includes considering the frequency with which a particular organism enters an area.

13. An organism identification device according to claim 1 in which said evaluating the non-facial attribute data of said arriving organism includes considering the frequency with which a particular organism exits an area.

14. An organism identification device according to claim 1, in which said attribute data is set to include a body height of an organism.

15. An organism identification device according to claim 1, in which said attribute data is set to an organism exiting from a specific area.

16. An organism identifying method according to claim 2 wherein said evaluating the non-facial attribute data of said arriving organism is performed prior to said comparing the face data of said arriving organism with stored face data.

\* \* \* \* \*